Figure 1:
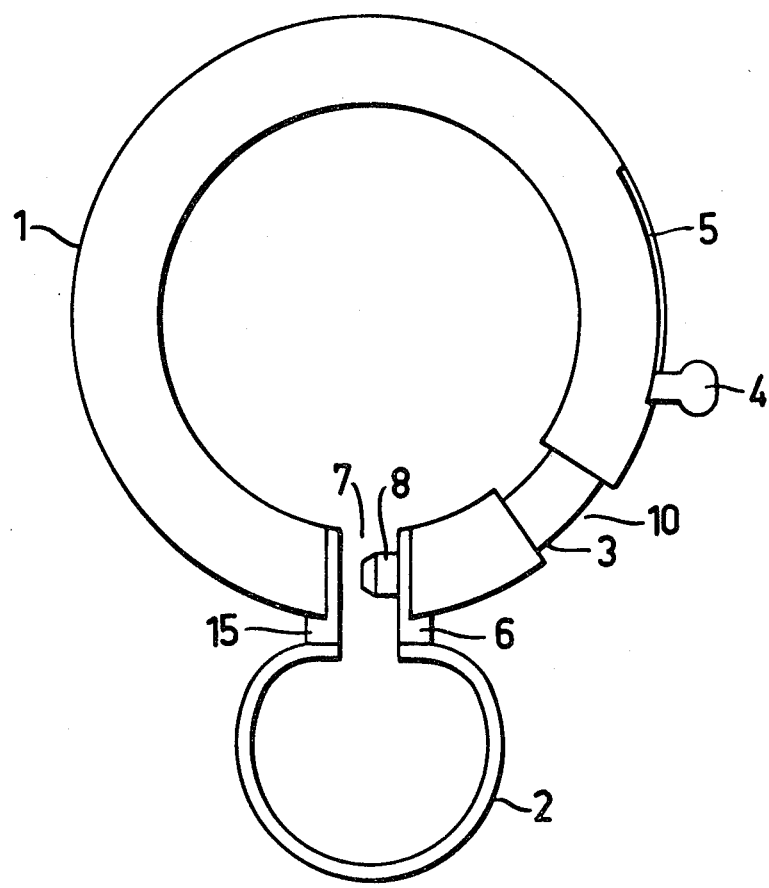

United States Patent [19]

Sander

[11] 4,430,778
[45] Feb. 14, 1984

[54] CIRCLIP

[75] Inventor: Bo T. Sander, Upplands Väsby, Sweden

[73] Assignee: Svenskt Guldsmide i Upplands Vasby AB, Sweden

[21] Appl. No.: 320,122

[22] Filed: Nov. 10, 1981

[30] Foreign Application Priority Data

Nov. 13, 1980 [SE] Sweden .............................. 8007966

[51] Int. Cl.³ ...................... A44B 13/02; A44B 15/00
[52] U.S. Cl. ..................................... 24/239; 24/3 K; 24/231; 24/237
[58] Field of Search ....................... 24/68 J, 69 J, 3 J, 24/3 K, 201 R, 239, 241 S, 240, 350, 370–374, 241 SL, 242, 238, 25, 335, 339, 336, 20 CW; 63/1 A, 2

[56] References Cited

U.S. PATENT DOCUMENTS

| 416,453 | 12/1889 | Fleischhauer | 24/239 |
| 1,244,599 | 10/1917 | Goozey | 24/239 |
| 1,296,718 | 3/1919 | Vaughan | 24/3 K |
| 3,950,828 | 4/1976 | Szamborski | 24/241 S |
| 4,097,169 | 6/1978 | Kelly | 24/235 |

FOREIGN PATENT DOCUMENTS 7400918  4/1974  Sweden .

Primary Examiner—Gene Mancene
Assistant Examiner—John G. Weiss
Attorney, Agent, or Firm—Cushman, Darby & Cushman

[57] ABSTRACT

A locking ring for necklaces and the like comprises a locking ring (1) and a second smaller ring (2) intended for fastening a necklace or the like, which rings prior to the attachment on a necklace include a slit (7) between the openings of the two rings, so that a necklace or the like is threaded through the slit on the smaller ring through the detachable opening of the circlip (1). After the necklace or the like has been threaded on, the two parts are pressed together, and in the slit centering and snap-in means are located, so that the two rings do not spring apart after the mounting.

1 Claim, 2 Drawing Figures

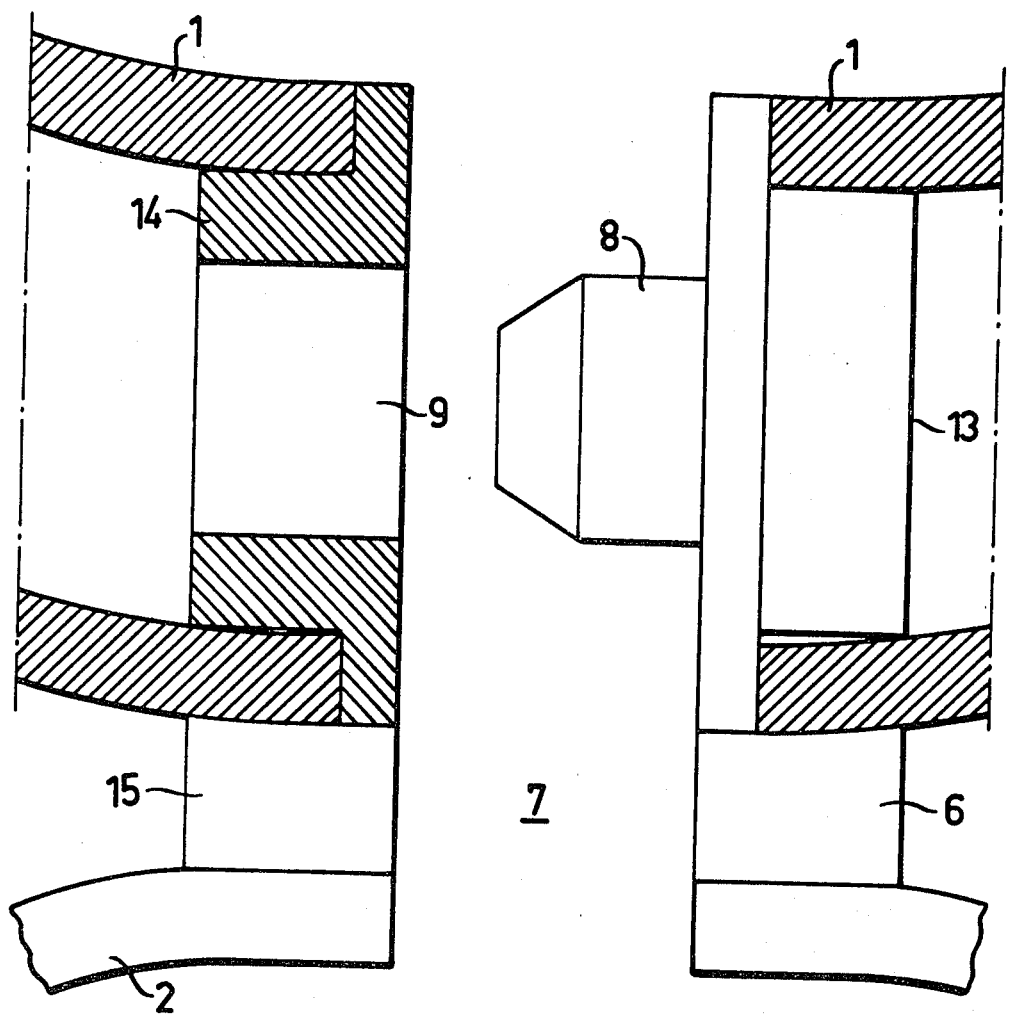

CIRCLIP

This invention relates to an improved circlip for use as lock in necklaces, bracelets and the like. The circlip, which at times is called spring ring or locking ring, thus, is the little ring, in which a latch bolt movable against a spring can be caused to release or open the locking ring.

The locking rings commercially available today, unfortunately, are relatively deficient in respect of safety, and it, therefore, happens often that a necklace falls off and at times gets lost just because of said deficient function. This per se is not due to poor functioning of the circlip proper, but rather has its reason in a poor attachment of the locking ring to its end of the necklace or bracelet. The poor attachment is a consequence of that the circlip is connected to the necklace or the like by means of a chain link, which merely is clamped together. The reason why this link merely is clamped together and not soldered, is that the small helical spring located in the circlip very probably will soften at a possible soldering operation, and the function of the circlip thereby again is jeopardized.

The present invention has the object to overcome this shortcoming and to produce a circlip, which can be attached easily to a necklace or the like without risk of loosening again. This object is achieved in that the circlip and the associated link or ring for attachment of the necklace proper together form an eight, which is slit open between the two openings in the eight, so that the necklace can be threaded in through the opening of the locking ring or circlip and then be introduced into the second ring, which generally is smaller. Thereafter the slit is pressed together and the necklace is ready for use.

At a suitable further development, the slit includes centering means, so that the circlip assumes correct working position when the slit is pressed together. It may also be suitable to provide the centering means with a snap-in effect of some kind. Alternatively, of course, a locking peg or locking rivet can be imagined to additionally ensure that the arrangement does not open again, for example when the circlip is opened carelessly.

The invention is described in greater detail in the following by way of an embodiment and with reference to the accompanying drawings, in which FIG. 1 shows a circlip according to the invention, and FIG. 2 is a section of a detail of said circlip.

The embodiment illustrated in the drawings is not only an embodiment of the invention, but also shows a further development thereof, which renders it possible to utilize the invention in already existing locking rings, which can be favourable in view of the material (gold) costs. The circlip according to the invention, as appears from FIG. 1, comprises in usual manner a larger and a smaller ring. The larger ring, which so to speak is the locking ring, is designated by 1, and the smaller ring, i.e. the attachment ring acting as a fastener for the chain or necklace, is designated by 2. These two rings are interconnected in the way as shown in greater detail in FIG. 2. The circlip is shown in a state ready for mounting, i.e. while the slit or opening 7 between the two rings 1 and 2 is open. Upon mounting, the latch 3 is drawn into the locking ring 1 by means of the knob 4, which runs in the slit 5, so that an end loop or end link for the chain or necklace can be hooked into the larger ring and through the slit 7 be moved over to suspend in the fastening ring 2. Thereafter the latch 3 and knob 4 can be permitted to spring ahead into locking position, whereafter the space or slit 7 is pressed together so that the male and female parts shown in FIG. 2 engage with each other, and the end link threaded on now is attached to the circlip and cannot get lost. As appears from FIG. 2, at this embodiment the fastening members consist of members 13 and, respectively, 14, which are inserted into a conventional circlip, after is has been cut open, and project into the tubular ring and with a flange abut the edge. The fastening members 13 and 14 comprise a male portion 8 and, respectively, a female portion 9, which are intended to engage with each other, preferably with friction fit, but also other variants can be imagined, with a snap-in effect of some kind. These members 13 and 14 then transform into the fastening ring 2 at projections 6 and 15 thereon. The pressing together of the slit 7, and thereby the closing of the fastening ring 2, preferably can be carried out with a special tool adapted to the circlip so as to ensure that the prevailing force is sufficient to bring about a satisfactory riveting.

A natural consequence of the invention idea is that the locking ring with the entrance opening 10 closed by the latch 3 readily ends up close to the fastening ring 2, and that the opening movement for the knob 4 in the slit 5 will take place from the fastening ring 2, contrary to what is the case with conventional circlips, which implies that an end link, which is hooked into the locking ring 1, must be moved over the knob 4 before it can be loosened. This in its turn increases additionally the safety by the locking ring according to the invention, if some fault should arise on the same.

At the embodiment shown in FIG. 2, the fastening members 13 and 14 preferably can be designed so that press fit is obtained relative to the locking ring 1, whereby the need of soldering and thereby also the risk of a softening of the locking spring is eliminated.

In the drawings a variant of the invention was shown to be used for modifying already existing circlips, but it is, of course, commercially most practical to manufacture from the beginning circlips in the factory which show the specification of the invention.

What I claim is:

1. A circlip comprising a locking ring and a fastening ring of smaller size than the locking ring fastened together in a figure eight configuration, said locking ring having an entrance opening and a movable latch for opening and closing said entrance opening, said rings having spaced-apart opposite ends at the location where the rings are fastened together so as to form a slit between the central openings in the two rings, said locking ring being sufficiently deformable that its spaced-apart ends can be pressed together to close said slit; and retaining members located in said slit for maintaining said slit in a closed state after deformation of said locking ring.

* * * * *